United States Patent Office 3,189,429
Patented June 15, 1965

3,189,429
METHOD OF CONTROLLING PLANT GROWTH
John F. Olin, Ballwin, Mo., assignor to Pennsalt Chemicals Corporation, Philadelphia, Pa., a corporation of Pennsylvania
No Drawing. Filed Feb. 13, 1963, Ser. No. 258,141
4 Claims. (Cl. 71—2.5)

This invention relates to the use of a novel class of heterocyclic compounds as agricultural chemicals. The novel compounds useful in this invention have the following chemical structure

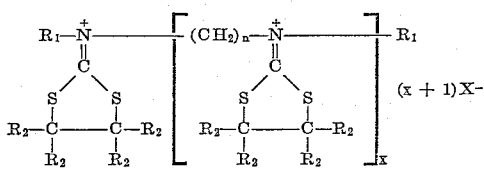

where the $R_1$ radicals are alkyl, cycloalkyl, or aralkyl radicals, the $R_2$ radicals are hydrogen, alkyl, cycloalkyl, haloalkyl or aryl radicals, $X^-$ is a halogen ion, $n$ is a small integer greater than one, and $x$ is zero or a small integer. These compounds and their preparation are the subject of my United States patent application Serial Number 33,910, filed June 6, 1960, now U.S. Patent No. 3,139,439 of which this application is a continuation in part.

It is well known in the chemical art to react alkali metal salts of dithiocarbamates with an alkyl halide to obtain esters of the dithiocarbamic acids, viz., $$(CH_3)_2-N-\overset{\overset{S}{\|}}{C}-S-Na + Cl-C_2H_5 \longrightarrow$$
$$(CH_3)_2-N-\overset{\overset{S}{\|}}{C}-S-C_2H_5 + NaCl$$

Likewise, it is known from U.S. Patent 2,744,898 that a polyhaloolefin (e.g., an alkenyl dihalide) will react with an alkali metal dithiocarbamate to yield the haloalkenyl ester. Thus, sodium dimethyldithiocarbamate and 1,3-dichloro-2-butene yield 3-chloro-2-butenyl-dimethyldithiocarbamate. It is also known to prepare bis-alkylene diesters of dithiocarbamates by reaction of two moles of the dithiocarbamate salt with one mole of an alkylene dihalide. Thus, U.S. Patent 2,384,577 shows the preparation of methylene bis(dimethyldithiocarbamate) by reaction of methylene dichloride with sodium dimethyldithiocarbamate. This patent also discloses that instead of using methylene dichloride, other acyclic dihaloalkanes may be employed to give similar diesters such as ethylene dichloride, ethylene dibromide, trimethylene dibromide, and the like, although no examples are given to confirm this prediction.

It has now been unexpectedly found, however, that when alkali metal dithiocarbamates are reacted with certain alkylene dihalides, simple ester formation does not occur, but a novel class of compounds is obtained. The novel heterocyclic compounds above defined where $X^-$ is $Br^-$ are obtained by reacting an alkali metal salt of a dithiocarbamate with a stoichiometric excess of an ethylene dihalide having the structure

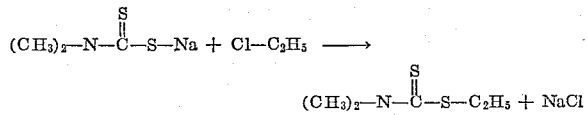

where $R_2$ is selected from the group of hydrogen, alkyl, cycloalkyl, haloalkyl and aryl radicals and X is a halogen atom selected from the group of bromine and chlorine atoms.

To prepare these novel bromides it is preferred to add a solution of the dithiocarbamate salt, preferably an aqueous, an alcoholic, or an aqueous-alcoholic solution of the dithiocarbamate, to a stirred solution of the dihalide in a solvent such as an alcohol or an aromatic hydrocarbon (e.g., benzene). By adding the dithiocarbamate to the dihalide an excess of dihalide is always present. The process is exothermic and is triggered by mild heating of the dihalide solution to about 50° to 90° C. The products are isolated readily in the usual manner by crystallization, by evaporation of the solvent medium, by extraction, or by combinations of these techniques.

The alkali metal dithiocarbamate reactants are well known compounds prepared by reaction of carbon disulfide with the appropriate amine in an aqueous alkali metal hydroxide solution. The dithiocarbamates may be derived from any of a wide variety of secondary mono- and polyamines such as N,N-dialkyl amines, N-alkyl-N-cycloalkyl amines, N,N-dicycloalkyl amines, N,N-diaralkyl amines, N-alkyl-N-aralkyl amines, N,N'-dialkylalkylene diamines, N,N''-dialkyl-dialkylene triamines, and the like. Some specific amines which exemplify these classes are dimethylamine, ethyl methylamine, methylcyclohexylamine, dibutylamine, dicyclohexylamine, di-n-octylamine, di-dodecylamine, dibenzylamine, benzyl-methylamine, N,N'-diethyl-1,6-hexanediamine, N,N'-dimethyl-1,4-butanediamine, N,N'-dimethyl-ethylene diamine, N,N''-dimethyl-diethylene triamine, and the like. Preferably, the dithiocarbamates used will be N,N-dialkyldithiocarbamates containing from one to about twelve carbon atoms in each alkyl radical. It will be understood that mixtures of amines may be reacted with the carbon disulfide and the mixture of dithiocarbamates thus formed reacted with the dihalide to produce mixtures of products.

The ethylene dihalides having the above defined structure are also readily available compounds. It will be observed that dichlorides are excluded from the above structure since the compounds with structures like those of the invention are not obtained when dichlorides are used. Thus the dihalides operable include dibromides and bromo-chlorides as defined by the structural formula. The dihalides, as indicated, must be 1,2-dihalides since methylene dihalides and 1,3-dihalides give esters. However, because the $R_2$ groups may be selected from any of a wide variety of radicals, the 1,2-dihalides which may be used are large in number. As indicated, the $R_2$ radicals may be hydrogen, alkyl, cycloalkyl, haloalkyl, and aryl radicals and they may be the same or different. In order to avoid low reaction rates due to steric hindrance, however, it is preferred that not all the $R_2$ radicals of the dihalide used be bulky radicals (e.g., phenyl or naphthyl). Preferably, 1,2-dihalides will be used in which at least two $R_2$ radicals are hydrogen atoms. Specific examples of the dihalides which may be used include 1-bromo-2-chloroethane, 1,2-dibromoethane, 1,2,3-tribromopropane, 1,2-dibromo-3-chloropropane, 1,2-dibromo-1-phenylethane, 1,2-dibromo-n-hexane, 1,2-dibromo-n-octane, 1,2-dibromo-1-cyclohexylethane, 1,2-dibromo-1,2-diethylethane (i.e., 3,4-dibromo-n-hexane), 1-bromo-2-chloro-1,2-diphenylethane, 1,2-dibromoeicosane, 1,2-dibromo-1-naphthylethane, and the like. Preferably, the dihalides will be those where $R_2$ is hydrogen or where at least two $R_2$ radicals are hydrogen and the remaining $R_2$ radicals are hydrocarbon radicals containing up to twelve carbon atoms.

As can be seen from the above generic structure, the novel compounds obtained by the process of this invention are bromide salts. Accordingly, the lower molecular weight members of this class of compounds are water soluble and give a positive test for the bromide ion. When a simple dithiocarbamate (e.g. sodium dimethyldithiocarbamate) is reacted with the 1,2-dihalide, the value of $x$ is zero and the products will have the structure

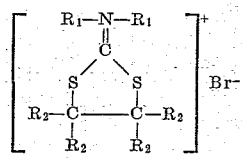

where $R_1$ and $R_2$ are defined above. When the dithiocarbamate is derived from an alkylene diamine, the value of $x$ is one and the integer $n$ corresponds to the number of methylene groups in the diamine chain. Thus, one mole of the bis-dithiocarbamate from N,N'-diethyl-1,4-butanediamine reacts with two moles of 1,2-dibromoethane to give

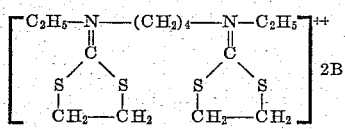

When the dithiocarbamate is a polydithiocarbamate derived from a polyalkylene polyamine the value of $x$ is greater than one. Thus, with the tri-dithiocarbamate from N,N''-dimethyl-diethylenetriamine and 3,4-dibromohexane the compound obtained is

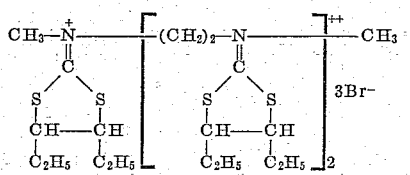

As indicated, the process yields the novel compounds where $X^-$ is a bromide ion. However, these bromides are readily converted to other halide salts of hydroxides. Thus the bromide is converted to the chloride compound by blowing air through an aqueous solution of the bromide containing HCl and a small amount of $HNO_3$. In this way the bromide ion is oxidized to $Br_2$ which is volatilized from the system leaving the chloride which is readily isolated. The same technique can be used to obtain the fluoride salt using HF instead of HCl. The hydroxide is readily obtained by reacting silver oxide with the bromide salt in the manner used to convert quaternary halides to hydroxides. These halides and hydroxides are similarly effective as is the bromide in treating plants and use as agricultural chemicals.

The lower molecular weight members of this novel class of heterocyclic compounds are colorless, crystalline solids, soluble in water, and have sharply defined melting points. As the molecular weight increases above about 350 the compounds become oils or waxy solids. Where the compounds have a long chain substituent they are effective surfactants by virtue of their combined ionic (hydrophilic) and oleophylic character. These compounds also have antimicrobial and disinfectant activity as expected from their similarity to quaternary ammonium halides. Those compounds wherein $R_1$ is a lower alkyl group (i.e., from one to four carbon atoms) are useful as insecticides, being particularly effective on mites. All of the compounds of the above defined structure show plant growth response effects, but when the $R_1$ radical is a long chain radical containing from about six to twelve carbon atoms the compounds are most valuable agricultural chemicals as plant defoliants and desiccants. Thus, the compounds above defined are useful for the control of plant growth by contacting plants with a phytotoxic amount of the compounds. The compounds are of value as herbicides, both for pre-emergent and post-emergent herbicidal applications, but will be used preferably for defoliant activity. The phytotoxic amounts at which the compounds may be used will vary from concentrations ranging from 0.5 to 10 pounds per acre. The compounds may be formulated as solutions or dispersions in water or as dispersions or solutions in organic solvents. To prepare such liquid formulations a suitable wetting agent may be added which aids in the preparation of the formulation and which also serves to help penetration of the compound into the plant and soil surfaces. Suitable water dispersion concentrates may be prepared with or without suspending agents by ball milling or other fine grinding techniques. Suspending agents will be selected from the various agents readily available, such as lignin sulfonates, bentonite, dilute solutions of methocel, and the like. Formulations may also be prepared as emulsion concentrates for dilution with water for field applications. These may be prepared by the use of suitable solvents such as xylene, heavy aromatic naphtha, isophorone with the addition of suitable emulsifying agents which are usually blends of various compounds having the proper ratios of oil and water solubility properties and which are stable in the presence of the compound. Wettable powders may be prepared by direct grinding of the dry compound with a blend of suitable dispersing agents such as attapulgite, bentonite, kieselguhr, etc. It is desirable to grind such a blend in a hammer mill so that 99% will pass through a 325 mesh screen. Wettable powders may also be prepared by absorbing a solution of this compound in a solvent such as xylene or acetone on a powdered or granular clay such as attapulgite or diatomaceous earth. All wettable powder preparations should contain a dispersing agent such as a lignin sulfonate and a wetting agent such as an alkyl aryl polyether glycol.

Any or all of the above preparations may be used in formulating granules of 5 to 20% composition of active ingredient. Either may make applications employing a granular applicator rather than a duster or sprayer and known methods in commercial use are applicable for the preparation of granular formulations. Preferably, however, because of their ready water solubility, the compounds will be formulated as aqueous systems.

When used for pre-emergence control of weeds, the method involves the application of the chemical to the soil some time prior to the emergence of the crop. The application can be conveniently made at the same time as the seeding operation and most commonly involves the use of a sprayer attachment to the planter which applies the diluted chemical on the soil surface immediately after covering the seed. Only a band of the seed row may be treated with the herbicide, or the whole area may be treated on a broadcast basis. The chemical may or may not be mixed with the first one or two inches of soil at the time of this application using a suitable rotary tiller.

The compositions may also be used in post-emergence applications for weed control where the emerged crop is sufficiently resistant. These applications may be made particularly in the period between emergence and the first cultivation of the crop, but treatments may also be made at later times such as the so-called layby treatment after the last possible cultivation to inhibit weed growth up to the time of harvest.

As indicated, the preferred use of these compositions will be as harvest aid chemicals which will either desiccate or defoliate the green leaves on susceptible crops and also desiccate any weeds which may be present in order to facilitate the mechanical harvesting with a combine in the case of seed crops or a picker or stripper for such a crop as cotton. Application to the crop is made simply by spraying or dusting the compound, preferably in a suitable carrier, on the crops to be treated.

The following examples will further illustrate the preparation and use of the novel compounds of this invention.

EXAMPLE 1

A solution of 225 g. (1.55 m.) of ethylenechlorobromide in 100 g. of methanol is placed in a flask fitted with a mechanical stirrer. Then an aqueous solution containing 439 g. (1 m.) of sodium dibutyldithiocarbamate is added dropwise. A mild exothermic reaction occurs and the temperature of the reaction mass is held at about 50° C., by external cooling. When the addition is complete the aqueous solution is evaporated under vacuum to a volume of about 400 cc. and 1 liter of isopropanol is added and the solid NaCl which precipitates from solution is filtered off. Then, 500 cc. of benzene is added to the filtrate and the solution is evaporated under vacuum to 400 cc. volume. Then, 500 cc. of toluene is added and the vacuum distillation is continued, another 1000 cc. of toluene being added during the distillation to remove all the water. When the water is entirely removed crystallization begins and the mass is held refrigerated overnight. The crystals are then filtered off, dried at 70° C.; the weight of dried crystals being 328 g. The dry, white crystals melt at 120° to 122° C. They are soluble in water, ethanol and hot acetone, but insoluble in cold acetone, benzene and hexane. A test for bromide ion on the aqueous solution of the compound is found to be positive. Based on this and the analysis of the compound, the structure is designated as follows:

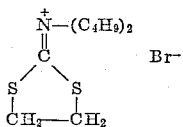

*Analysis.*—Found/theory: percent C, 42.28/42.3; percent H, 7.13/7.10; percent N, 4.47/4.48; percent S, 20.56/20.53; percent Br, 25.63/25.59.

EXAMPLE 2

A solution of 287 g. (2 m.) of ethylenechlorobromide in 300 g. of methanol is placed in a flask fitted with a mechanical stirrer and the solution is heated to 50° C. Then as the solution is stirred, a 40% by weight aqueous solution of dimethyldithiocarbamate containing 714 g. (2 m.) of sodium dimethyldithiocarbamate is added dropwise over a one-hour period, cooling as necessary to maintain the temperature at about 60° C. The reaction mass is then allowed to stand 48 hours after which it is twice extracted with 200 cc. of toluene, and the extract evaporated until virtually dry. The resulting oil and salt residue is taken up in about 600 cc. of warm butanol and filtered to remove the NaCl. To the filtrate is then added a liter of toluene and the solution cooled, after which a large crop of crystals is obtained. These are filtered, sucked dry, and are dried in an oven at 65° C. thus obtaining 370 g. of colorless crystals melting at 166–168° C. The product which has the structure

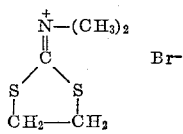

is soluble in water, alcohol, and slightly soluble in toluene. It is insoluble in hexane and acetone.

*Analysis.*—Found/theory: percent Br, 34.2/35.7; percent S, 27.6/28.

EXAMPLE 3

A solution of 40.5 g. of 98% sodium hydroxide in 350 g. of methanol is prepared and 241 g. (1 m.) of dioctylamine is added with agitation while cooling the reaction mass at ice-water temperature. Then 80 g. of carbon disulfide is added dropwise and stirring is continued for an additional 30 minutes after the carbon disulfide has been completely added. Excess carbon disulfide is removed from the reaction mass by warming and applying slight vacuum.

A solution of 160 g. of ethylenechlorobromide in 100 g. of methanol is placed in a flask equipped with mechanical stirrer and the above dithiocarbamate solution is slowly added. A mild exothermic reaction is observed, the temperature rising to 60° C. where it is held during the reaction period. When the addition of the dithiocarbamate solution is completed, the reaction mass is stirred at 60° C. for another half hour and the reaction mass filtered to remove the sodium chloride which had formed. The filtrate is partially distilled under reduced pressure on a water bath and the residue obtained is dissolved in 400 cc. of benzene and filtered to remove some additional salt which separates. The filtrate is again evaporated to dryness yielding 427 g. of clear syrup which is dissolved in 50% aqueous methanol and that solution is extracted with ligroin. The methanol solution is then evaporated to dryness on a water bath under vacuum and on standing overnight in the ice box it turns to a waxy solid which liquefies at about 15° C.

The product is assigned the following structure:

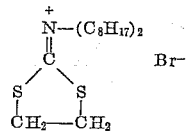

EXAMPLE 4

Example 3 was repeated with dinonylamine instead of dioctylamine to yield an amber syrup, which product is characterized by the structure

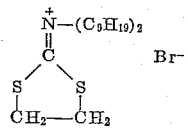

This product was soluble in ethanol, ether, benzene, acetone, water and hexane.

EXAMPLE 5

Following the details of Example 3, sodium di-decyldithiocarbamate is prepared and reacted with ethylenechlorobromide. The product has the structure:

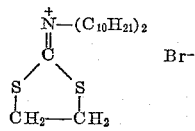

and is a pale yellow oil which solidifies on standing and melts at about 28° C.

EXAMPLE 6

Following the details of Example 2, sodium dimethyldithiocarbamate solution is added to a methanol solution of 1,2,3-tribromopropane. The reaction mass is then vacuum distilled, the residue is taken up with water which is again vacuum distilled off, and the residue extracted with warm methanol. The methanol solution is evaporated to dryness on a water bath under vacuum and taken up in a small amount of hot water and the solution is placed in a refrigerator. The crystals which form are filtered off, washed with a small amount of cold water and oven dried. The product which is assigned the structure:

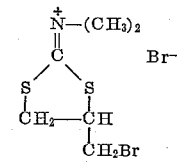

is soluble in chloroform, ethanol and water and insoluble in most other solvents. The crystalline product decomposes at 250° C.

EXAMPLE 7

A solution of 240 g. of 1,2-dibromoethyl benzene (0.91 moles) in 100 g. of benzene is heated to 60° C. and 529 g. (0.91 moles) of a methanolic sodium dibutyldithiocarbamate solution is slowly added over one half hour period. The salt is filtered off and the filtrate distilled on a water bath. Upon taking up the residue with hot acetone and filtering, the filtrate upon evaporation to dryness yields a viscous amber colored oil which is confirmed by bromine analysis to be

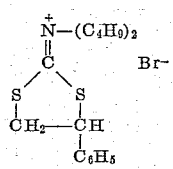

EXAMPLE 8

N,N-dibenzyldithiocarbamate sodium salt is prepared from dibenzyl amine and carbon disulfide in an aqueous butanol solution containing caustic. This dithiocarbamate solution (1 mole) is added to a solution of 157 g. (1.1 mole) of ethylenechlorobromide in 100 g. of butanol heated to 60° C. The reaction mass is evaporated under vacuum and is extracted with an aqueous methanol solution from which is obtained pale yellow crystals melting at 164 to 165° C. These crystals are soluble in water and ethanol, insoluble in acetone and benzene. The compound is assigned the structure:

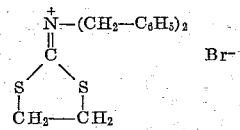

EXAMPLE 9

To a solution of 240 g. (0.88 mole) of 1,2-dibromoctane in 200 cc. of isopropanol there is slowly added with stirring and at 80° C., 480 g. of a 30.6% aqueous solution of sodium diethyldithiocarbamate. The reaction product contains a small amount of yellow oil which is removed by extraction with several portions of carbon tetrachloride. The aqueous alcoholic reaction mass is then evaporated to dryness under vacuum, and the residue is taken up with 150 cc. of butanol and 200 cc. of acetone from which was filtered off the sodium bromide salt which had formed. The filtrate is evaporated under vacuum, and the light yellow residual oil is taken up with 250 cc. of acetone and again evaporated to dryness under vacuum. The pale amber syrup which is obtained is assigned the structure:

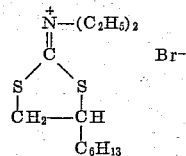

*Analysis.*—Found/theory: percent Br, 23.9/23.5; percent S, 18.3/18.8.

EXAMPLE 10

Following the details of Example 9, 1,2-dibromododecane is reacted with sodium diethyldithiocarbamate to yield an oil of structure

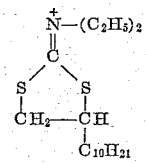

*Analysis.*—Found/theory: percent Br, 19/20.2.

EXAMPLE 11

An excess of carbon disulfide is slowly added to an aqueous caustic solution of N,N-diethyl-ethylenediamine in order to prepare the corresponding dithiocarbamate. A slurry of this dithiocarbamate is then added to an alcoholic solution of ethylenechlorobromide at reflux and a mild exothermic reaction is observed to occur. After the addition is complete the mixture is refluxed for an additional 15 minutes and then most of the alcohol is distilled off and the aqueous solution extracted three times with chloroform. The aqueous portion of the extract is evaporated to dryness and the water is removed by repeated distillations with a mixture of pentanols, with isopropanol and finally with a mixture of isopropanol and benzene. After standing overnight the residue obtained is partly crystalline. Toluene is then added and the mixture is cooled to −15° C. The crystals thus obtained are filtered off and washed with acetone containing a little methanol. The very deliquescent crystals are taken up in hot isopropanol, filtered, and the crystals again taken up in benzene and the mass azeotropically dehydrated. The residue is cooled to −15° C. and the crystalline solid obtained is filtered off and washed with isopropanol and dried. The white crystals melt at 203–208° C. with decomposition. Analysis as shown below confirms the following structure:

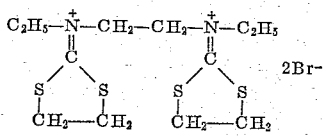

*Analysis.*—Found/theory: percent N, 5.2/5.8; percent S, 25.0/26.7.

Evaluation of compounds

EXAMPLE 12

An aqueous dispersion of the test compound is prepared and applied by spraying onto mature cotton plants. The number of leaves per plant is determined before the application and two weeks after treatment. The results are expressed as percent of leaves defoliated.

The following table indicates the data obtained:

TABLE I

| Agent Applied to Cotton Plants | Rate of Application, lbs./acre | Percent Defoliation |
|---|---|---|
| Compound of Ex. 3 | 2 | 100 |
| Compound of Ex. 5 | 2 | 73 |

EXAMPLE 13

Example 12 was repeated except that the agent was sprayed on black valentine bean plants at a rate of 1 pound per acre. In this test the compound of Example 5 gave 88% defoliation after three weeks observation.

EXAMPLE 14

Desiccation effects were determined by observation of the primary leaves of black valentine bean plants which had been sprayed with aqueous dispersions of the plant response agents. Table II illustrates the data obtained.

TABLE II

| Agent Applied to Bean Plant | Rate of Application, lbs./acre | Percent Defoliation |
|---|---|---|
| Compound of Ex. 3 | 10 | 100 |
| Compound of Ex. 4 | 10 | 100 |
| Compound of Ex. 4 | 10 | 100 |

EXAMPLE 15

When an acetone solution containing 0.2% by weight of the compound of Example 4 was sprayed on lambsquarter (*Chenopodium album*), the weed was completely killed.

In a similar manner, when the compounds of Examples 1, 2, 7, 8, 9, 10 and 11 are evaluated on plants, a plant response effect is obtained.

It will be apparent to the skilled art worker than many changes may be made from the above description of this invention without departing from its spirit and scope and such variations are to be considered as within the purview of the invention.

I claim:
1. The method of contacting plants with a phytotoxic amount of a compound having the chemical structure

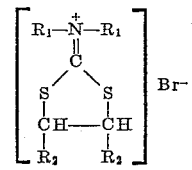

where $R_1$ is alkyl containing from one to twelve carbon atoms and $R_2$ is hydrogen.
2. The method of claim 1 where $R_1$ is decyl and $R_2$ is hydrogen.
3. The method of claim 1 where $R_1$ is octyl and $R_2$ is hydrogen.
4. The method of claim 1 where $R_1$ is nonyl and $R_2$ is hydrogen.

References Cited by the Examiner
UNITED STATES PATENTS
3,139,439  6/64  Olin _____ 71—2.5

LEWIS GOTTS, *Primary Examiner.*
JULIAN S. LEVITT, *Examiner.*

UNITED STATES PATENT OFFICE
CERTIFICATE OF CORRECTION

Patent No. 3,189,429                                                              June 15, 196

John F. Olin

It is hereby certified that error appears in the above numbered patent requiring correction and that the said Letters Patent should read as corrected below.

Column 9, TABLE II, under the heading "Agent Applied to Bean Plants", line 3 thereof, for "Compound of *Ex. 4" read -- Compound of Ex. 5 --; same column, same table, heading to the third column, for "Percent Defoliation" read -- Percent Desiccation --.

Signed and sealed this 16th day of November 1965.

(SEAL)
Attest:

ERNEST W. SWIDER
Attesting Officer

EDWARD J. BRENNER
Commissioner of Patents